Patented Sept. 22, 1925.

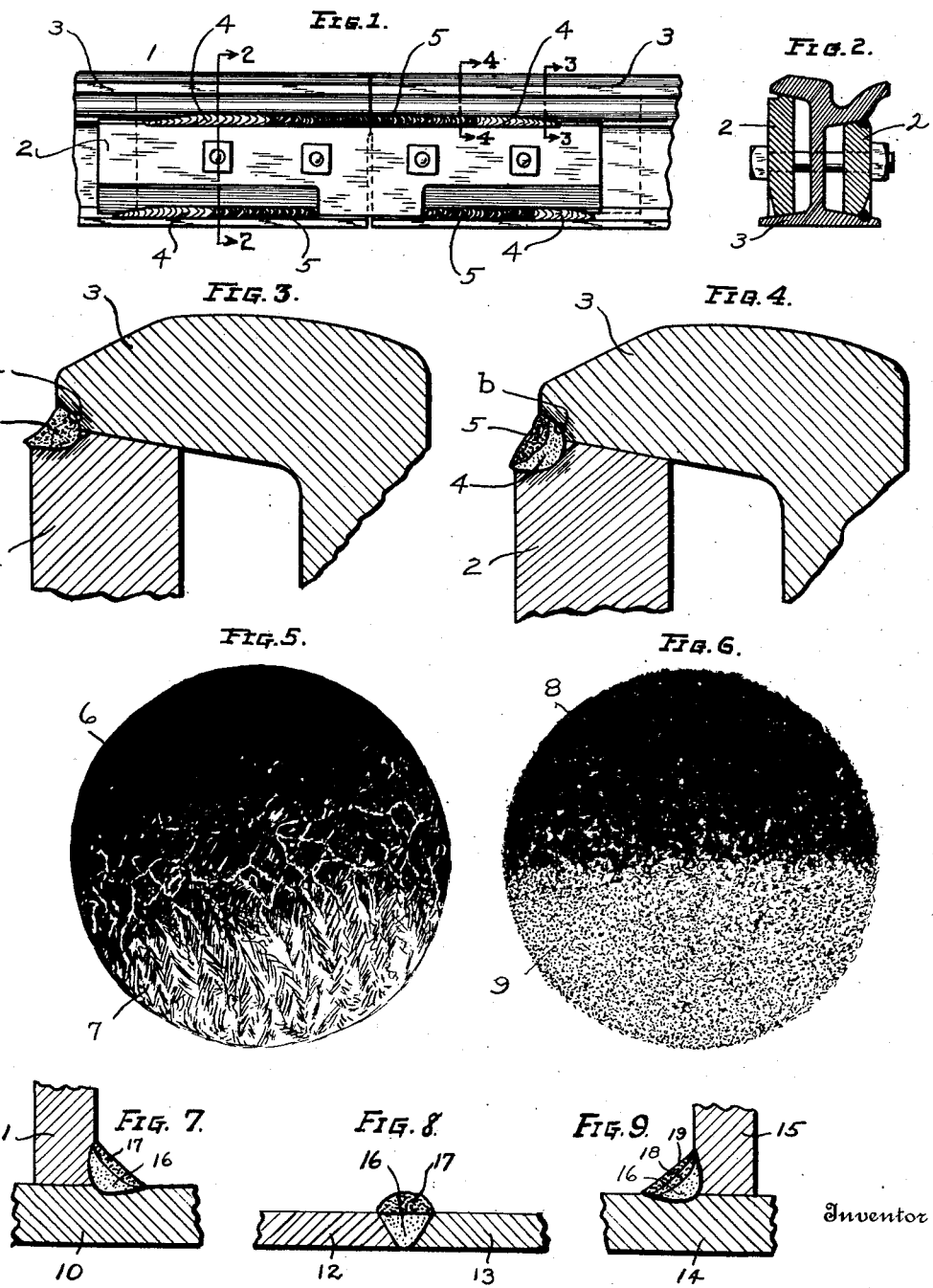

1,554,546

UNITED STATES PATENT OFFICE.

JOHN B. AUSTIN, OF CLEVELAND, OHIO, ASSIGNOR TO RAIL WELDING & BONDING COMPANY, OF CLEVELAND, OHIO, A CORPORATION OF DELAWARE.

SEAM-WELDING PROCESS.

Application filed April 4, 1925. Serial No. 20,577.

*To all whom it may concern:*

Be it known that I, JOHN B. AUSTIN, a citizen of the United States, residing at Cleveland, in the county of Cuyahoga and State of Ohio, have invented certain new and useful Improvements in Seam-Welding Processes, of which the following is a specification.

My invention relates to the art of seam welding.

One of the objects of this invention is to provide a process of uniting metal articles or fabrications or portions thereof, by seam welding, whereby a weld is formed of greatly superior properties as compared with welds obtained by previous seam welding processes.

Another object of the invention is to provide a process of uniting metal articles or fabrications, or portions thereof, by seam welding whereby increased strength, decreased internal stresses, refined grain structure and better mechanical properties in general are produced both in the weld metal and in the metal portions adjacent thereto.

A further object of the invention is to provide an electric arc process of uniting metal portions by seam welding whereby the seam weld is not only formed, but at the same time the structure and properties in general of both the weld and adjacent metal portions are improved in a manner and to an extent hitherto unobtainable.

Another object of my invention is to provide a seam welding process for uniting ferrous portions by the electric arc, whereby, by the welding operation itself, improved properties are produced in the weld metal and in the adjacent portions thus united.

A further object of this invention is to provide an improved process for uniting metal articles or fabrications by seam welding whereby a minimum of internal stresses remain in the welded articles after such welding.

These and other objects will be apparent from the following description and attached drawings forming a part of this specification.

In the welding art, it is common practice to unite ferrous articles or fabrications, or portions of an article or fabrication by seam welding, as by the electric arc. These articles, fabrications or portions to be welded are frequently termed "base metals" in the art. Such welded articles, fabrications, or portions, however, are frequently of considerably lower quality than similar articles or portions formed entirely of unwelded metal. Thus an unwelded article may be substantially uniform in hardness and in quality of structure throughout, and so free from any notch effect or sudden changes in structure, as from hard to soft, or as from fine-grained to coarse-grained structure. Furthermore, such unwelded articles may be substantially free from internal stresses.

In seam-welding ferrous base metal portions, therefore, it is desired that no appreciable internal stresses or notch effect be introduced into such base metal portions as a result of the welding operation. It is also desired that the weld metal itself be substantially solid, non-porous and fine-grained, in order to obtain a weld of maximum strength.

It has been found, however, that seam welds produced prior to my invention have possessed internal stresses, which under certain conditions were tremendous; were often brittle, low in tensile strength and ductility; and frequently broke through or separated from one or the other of the base metals. The reasons for these defects are believed to reside in part, at least, in the method of formation and structure of the weld metal.

Metallographic examination of such seam welds discloses a relatively hard, coarse-grained structure, not only in the weld, but also in the base metals adjacent to the line of fusion. If, for example, a low carbon welding rod or electrode be used, the amount of hard structure and the hardness thereof in the resulting seam weld will be increased with increasing carbon content of the base metal. In the case where seam metal is disposed adjacent to medium or relatively high carbon base metal, there frequently will be produced in the base metal adjacent to the line of fusion, a coarse structure, consisting in part of portions of hard, relatively brittle material, such as martensite or troostite, whereas the original base metal may have been of a relatively soft structure such as pearlite. The proportion of hard, brittle constituent produced is dependent in part upon the carbon content of the welding rod and of the base metal, the higher carbon content producing more of the hard brittle constituent. In the weld metal itself will usually be found a coarse-grained structure, partly composed of columnar grains, the formation of which will be readily understood from the following considerations regarding crystal growth in castings, it being understood that seam welds are in reality metal castings.

When a metal is cast from a temperature considerably above its melting point, the resultant crystal structure is coarse. Further, crystals tend to grow along the line of heat flow, direction of the growth taking place opposite to that of the flow. Thus, if a certain portion of the molten metal is chilled, elongated or columnar crystals tend to grow away from the point of chilling.

In welding, the high temperature of the heating medium, such as the electric arc, raises the temperature of the metal fused thereby considerably above its melting point. At the same time the base metal adjacent thereto exerts a chilling effect on the molten seam metal, producing crystal nuclei more or less simultaneously, which tend to grow in all directions. The growth is prevented in the direction of the base metal, and the crystals have but a limited growth in a sidewise direction since they can grow only until they meet the portions of the adjacent crystals. Since the seam metal at any instant is too hot to allow of the formation of fresh nuclei, the growth of the crystals is practically limited to one direction, namely, away from the base metal, with the resulting formation of large and elongated or columnar crystals in the weld structure at right angles to the base metal united therewith.

From the foregoing it will be understood that in welds produced by previous seam-welding processes, serious notch effects may be produced resulting in sudden changes in the structure from hard to soft, and from fine-grained to coarse-grained metal, and the weld metal itself may be of coarse columnar crystal structure. Further, serious internal stresses may be introduced as a result of the welding process.

It will be noted that it is desirable that the metal of the weld and of adjacent base metal or metals united thereto be solid and non-porous, of relatively fine grain size, relatively free from embrittlement and from internal stresses. The absence of coarse grain layers or embrittlements in the base metals or metal adjacent to the line of fusion increases the strength and resistance to breakage and decreases the notch effect by providing a gradual transition in structure from the original base metal through to the arc fused metal supplied from the welding rod. Weld metal which is partly or wholly free from internal stresses set up by shrinkage of the molten metal in cooling can withstand correspondingly increased stresses or loads and is of correspondingly greater effective strength.

Hitherto, it has been necessary, in order to obtain metal of the foregoing improved properties and characteristics to subject the welded articles after welding to heat-treatment, such as in a furnace. It will be understood that internal stresses such as are set up in a ferrous metal as a result of a casting or welding operation may be relieved by heating said metal either below or above the temperature of the $Ac_1$ transformation as indicated in the iron-carbon equilibrium diagram. If the above-mentioned ferrous metal be heated below $Ac_1$, the stresses may be relieved but without causing any refinement of grain size and hence without any increase in the strength and ductility of the metal itself. By heating a ferrous metal above $Ac_1$, and in the case of low-carbon steels to about $Ac_3$, and cooling at a suitable rate, the initial internal stresses in said ferrous metal due to a casting or welding operation may be relieved and in addition a refinement of grain effected, whereby improved physical properties of the metal are obtained.

Certain types of articles or fabrications are of such shape or size or are welded under such conditions as to render very difficult if not impossible the furnace heat-treating of the welded articles and seam welds to relieve internal stresses and refine the grain. For example, railway rails in a track illustrate articles unsuited in shape, size and welding conditions for the prior art furnace heat-treating process. Even in the articles or fabrications which can be so treated, the furnace heat-treatment is not usually desirable, because the heat-treating effect extends to substantially the entire article or fabrication and is not localized in the seam metal and adjacent parts of the base metal, that is, it is not confined to improving the seam weld and removing or altering the coarse grain layer or embrittlement in the base metal or metals adjacent to the line of fusion. Further disadvantages of the furnace heat-treatment of welded articles or fabrication are the expense of equipment, maintenance, fuel and labor involved.

By my invention, however, I have not only produced seam welds which possess the foregoing desired properties of non-porosity, refined grain, increased strength and decreased internal stresses, but have also prevented the formation of or removed any embrittlement in the base metal or metals adjacent to the line of fusion of such seams.

Moreover, I have accomplished these results as a part of the welding operation so that an additional separate operation is unnecessary. My invention can thus be practiced on any articles or fabrications that can be welded, regardless of their shape or size, or the conditions of welding. It will be understood that my invention contemplates not merely annealing seam weld metal and adjacent base metal to produce a softening effect, but in addition my invention contemplates grain-refining to produce most desirable physical properties, such as tensile strength, ductility, and resistance to impact and fatigue in such seam weld metal and adjacent base metal.

The preferred manner of practicing my invention consists briefly in first forming a seam weld, and then superimposing thereon a refiner, consisting of a mass of metal melted by any suitable heating means such as an electric arc or a gas flame and under certain controlled conditions of time and temperature so as to grain-refine substantially all the metal of the seam weld and adjacent portions of base metal. The seam weld upon which the refiner is superimposed may consist of one or more integrally united separately formed seam welds. Still further improved results may be obtained by the use of suitable weld forming materials.

My invention has many practical applications, such as for example, the welding of fish plates to rails in the case of welded rail joints and the welding of relatively heavy tubing, conduits and tanks to be subjected to heavy internal pressures.

As a specific example of an application of my process as well as an illustration of the superiority thereof over ordinary prior art seam welding, I may describe the joining of two ferrous articles by carbon arc seam welding and the testing thereof by a modified Izod test. A relatively low carbon steel plate (0.16% carbon) was positioned vertically on and in juxtaposition to a horizontally positioned high carbon steel plate (0.70% carbon). Employing a carbon arc and the hand feed process, and a $\frac{3}{32}''$ diameter steel welding rod containing 0.10% carbon, a seam weld was formed joining the two articles, according to the following table of data:

Current_____ 200 amps.
Voltage_____ 38 volts.
Length seam weld_____ 3½ in.
Welding time_____ 2 min. 1 sec.
Amt. welding rod used_____ 11½ in.

Another pair of like articles were joined by my process, employing a carbon arc and a welding rod of like composition and size. In this case, after the seam weld had been formed, a refiner consisting of a mass of melted metal was superimposed upon the seam weld, this being accomplished in accordance with the following table of data:

|  | Seam weld | Refiner |
|---|---|---|
| Current | 200 amps | 200 amps. |
| Voltage | 38 volts | 38 volts. |
| Length seam weld | 3½ in. | 3½ in. |
| Welding time | 1 min. 40 sec. | 1 min. 20 sec. |
| Amt. welding rod used | 6 in. | 5½ in. |

The first welded specimen was designated as specimen A and the second, welded by my process, as specimen B. It will be noted that the same quantity of welding rod was used for the seam weld of specimen A, as for the seam weld and refiner of specimen B, so that the actual mass of arc melted metal in the two specimens was the same.

The above welded specimens were tested to fracture by a modification of the Izod test which consisted in striking the mild steel plates with a pivotally mounted swinging hammer of known weight, the high carbon steel being held in fixed position. The areas of fracture of specimens A and B were equal. Whereas 53 blows were required to fracture specimen A, over five times as many similar blows were required to fracture specimen B.

A further test illustrating the advantageous properties of welds made by my process was made as follows: Specimen C was made by uniting two horizontally disposed and slightly spaced apart pieces of low carbon steel by means of a seam weld. A low carbon steel welding rod was used and the carbon arc with about 200 amperes was employed as the source of heat. The same materials and welding set-up were employed for specimen D. In the latter case, however, a seam weld was first made, and a refiner, or mass of arc melted metal, was superimposed upon the seam weld. The total mass of welding rod employed in forming the two welded specimens was the same. Then these specimens were supported at the ends as in the Charpy test, but were subjected to the vertical drop of a known weight until fracture occurred. The areas of fracture of specimens C and D were equal. Four blows were required to fracture specimen C, welded by the single step process, the weight dropping from progressive heights of 2", 4", 6", and 8" respectively, whereas six blows from progressive heights of 2", 4", 6", 8", 10", and 12" were required to fracture specimen D, welded by my process.

Although these improved results may be traceable to various factors, it is my belief that they are primarily due to superimposing the arc melted refiner on the previously formed seam weld under the proper conditions of time and temperature. Apparently the formation of the superimposed arc melted refiner reheats the seam weld and zones of the base metal adjacent thereto, up to or somewhat above the $Ac_3$ temperature, where-upon a solid solution of the carbon in gamma-iron is formed. The stresses set up in the seam weld during its first cooling are largely if not entirely removed or relieved under the influence of the heat of the superimposed arc melted metal. Upon cooling the second time the steel re-crystallizes from the gamma-iron solid solution with a very fine grain size. If the steel should be heated to a temperature less than $Ac_1$ no solid solution is formed, and hence re-crystallization with fine grain size does not take place. Nevertheless, if the steel should be heated to a temperature less than $Ac_1$ improvement might still be expected such as would be due to the relieving of some internal stresses. The magnitude of this effect would evidently depend upon the temperature to which the steel was heated, and the time for which the steel was maintained at that temperature, greater relief of stresses taking place, of course, with the higher temperature and longer time of heating.

It may be said that by my process I accomplish a heat-treatment of the weld in which the metal of the seam weld and the adjacent base metal is grain-refined and further, any brittle constituents of the base metal adjacent to the weld are substantially eliminated. A further result is the tendency to relieve or remove internal stresses. This feature of relieving internal stresses in welds is particularly important and advantageous in cases where rigidly positioned structures, such as rails in tracks are to be united. It will be understood that the welded joint between such rigidly positioned structures, and consequently the welded structure in its entirety, will be greatly strengthened, and made considerably more resistant to forces such as impact, when the internal stresses set up by welding are in large measure relieved. It will be understood that in forming a weld between two rigidly positioned members, such as a fish plate and a rail, the shrinkage of the weld upon cooling induces stresses not only in the weld, but also in the adjacent articles united thereby, namely the fish plate and the rail.

The advantage of my process as applied to the welding of fish plates to rails in welded rail joints has been firmly established by means of tests designed to subject such joints to repeated impact stresses, similar to, but perhaps more severe than those received in service. Such tests have been carried out in a repeated impact testing machine in which a joint has been supported on an anvil and the head of one of the rails thereof struck by a 250 lb. hammer falling 10 inches, 70 times per minute. Under such test conditions, in joints welded with ordinary seam welds, said team welds have started to fail at approximately 50,000 blows whereas joints welded by my process have withstood upwards of 200,000 blows before the appearance of any signs of failure in the seam welds.

In carrying out my process, I prefer to use a carbon arc as a source of heat. I have employed currents from 130 to 300 amperes, although under special conditions I may desire to employ currents of smaller or greater magnitude than those mentioned. Preferably I employ the hand-feed method of adding a supply of welding material, wherein the welding rod is gradually fed into the arc to be melted as required. I prefer to employ a steel welding rod of good quality so that weld metal formed therefrom will be solid, non-porous, and relatively free from occluded gases and other foreign substances. I find it convenient to accomplish this result by employing a high quality steel welding rod having coated thereon or alloyed therewith suitable fluxing and deoxidizing agents, although my invention is to be in nowise construed as being limited to the use of such coated or alloyed welding rods. It may be desirable before forming a seam weld to preheat the portions to be welded adjacent to the location where the seam weld is to be started, for a relatively short period such as for about 15 seconds whereby any extreme chilling effect at such location is avoided, particularly when such preheated portions are initially very cold. This preheating may be accomplished with a carbon electrode, any suitable current such as 200 amperes, and a long arc length, whereby said preheating may be carried out without causing any melting of the said portions. The heat from the arc imparted to the rail and plate during seam welding may be relied upon for necessary preheating after the seam welding has started. I have found it convenient in practicing my process with the carbon arc to form seam welds and refining layers at the rate of from 1 to 4 inches per minute, and to melt the equivalent of from 1 to 2 inches of $\frac{9}{32}$ inch diameter rod in forming each inch of seam weld and refining layer, although with relatively low currents I may weld at a slower rate, and with high currents at a faster rate than mentioned above. In superimposing a refiner (as the term has been hereinbefore defined) of arc melted metal upon a seam weld a portion, though preferably not all, of the seam weld is melted and integrally united to the refiner. Frequently, I have found it desirable in practicing my process to superimpose upon a seam weld, a refiner equivalent in mass to from 25% to 400% of the mass of the seam weld metal. These limits are of course by way of example only, and in particular cases may be greater or less than the limits mentioned. It will be understood that it is simply necessary to use sufficient heat under certain controlled conditions of time and temperature in connection with the refiner superimposed upon the seam weld to remove any brittle constituents from and to grain-refine the seam weld and the adjacent portions of the base metals. For the purpose of further improving the weld, as by further stress-relieving and reduction of chilling effect, I may post-heat the completed weld in a manner similar to that described above for the preheating operation. In carrying out my invention by means of the metal arc, it is usually necessary to supply more current to accomplish these results than is customarily employed in metal arc seam welding.

While my invention has many applications, one advantageous application, as previously mentioned, is in connection with the seam welding of rail joints as will be more fully described hereinafter.

In the accompanying drawings, Figure 1 is a view in elevation of a rail joint wherein certain portions of the fish plate are united to the rail by means of seam welds and wherein, upon certain portions of said seam welds, a refiner of arc melted metal has been superimposed.

Fig. 2 is a vertical section on line 2—2 of Fig. 1, showing the fish plates in position, one fish plate being shown as before welding, and the other fish plate as after welding.

Fig. 3 is an enlarged fragmentary vertical section on line 3—3 of Fig. 1, showing the rail and fish plate as being joined merely by a seam weld.

Fig. 4 is an enlarged fragmentary vertical section on line 4—4 of Fig. 1, showing the rail and fish plate as being joined by a seam weld on which has been superimposed a refiner of arc melted metal, and indicating the fine-grained structure as produced in the metal of the seam weld.

Fig. 5 illustrates a photomicrograph at 75 diameters magnification taken at the junction of the weld and rail metal within the area indicated by the circle "$a$" in Fig. 3.

Fig. 6 illustrates a photomicrograph at 75 diameters magnification taken at the junction of the weld and rail metal within the area indicated by the circle "$b$" in Fig. 4.

Fig. 7 is a vertical section of two angularly disposed metal portions united by a seam weld upon which is superimposed a refiner of arc melted metal, according to my process.

Fig. 8 is a vertical section illustrating the application of my process to the uniting of two substantially abutting metal portions or substantially abutting ends of a single metal portion.

Fig. 9 is a vertical section of two angularly disposed metal portions united by two seam welds upon which is superimposed a refiner of arc melted metal according to my process.

In the drawings is indicated a rail joint 1 which is formed by bolting the fish plates 2 in juxtaposition to the ends of the rails 3. The fish plates 2 are then united to the rails 3 as by an electric arc seam weld 4. By superimposing a refiner 5 of arc melted metal upon certain portions of the seam weld 4, I obtain a rail joint of greatly increased strength due to a number of factors, including the increased mass of weld metal, the grain-refinement of the seam weld metal and adjacent rail and plate metals, and the substantial removal of brittle constituents and internal stresses therefrom. As a result of my process the weld metal adjacent to the rail ends, where the greatest strength is desired, and in the vicinity of which I have indicated the superimposing of a refiner 5 of arc melted metal by my process, is greatly increased in strength, is more ductile, and stresses set up in the joint by the seam welding operation are appreciably, if not entirely, relieved. It will be understood, of course, that I may superimpose a refiner 5 of arc melted metal upon each and every portion of the seam weld 4. Or further, I may desire to superimpose upon each portion or upon certain portions of the first seam weld 4 one or more refiners; a refiner, and thereupon one or more seam welds; or one or more seam welds and thereupon a refiner. I have experienced no welding difficulties due to slag or oxide in superimposing a refiner of arc melted metal by my process, particularly in carrying out the same by means of the carbon arc. I prefer, of course, to employ a good quality of metal, such as steel, as a welding rod or electrode. In carrying out my process, as in the welding of a rail joint, I prefer to use a welding rod having coated thereon or alloyed therewith deoxidizing and fluxing agents; but of course my invention is not to be construed as being limited to the use of such coated or alloyed welding rod or electrode.

In Fig. 3 is indicated an enlarged cross-sectional view of a seam weld 4 and the adjoining portions of rail 3 and fish plate 2. In Fig. 4 is indicated a similar view of a seam weld 4 upon which has been superimposed a refiner 5 of arc melted metal. The macrostructure of the weld in Fig. 4 indicates the marked refinement of grain in the portion of the weld occupied by the seam weld 4. Figs. 4 and 6 of an ordinary seam weld, and of a weld made by my process respectively, represent the microstructure of the junction between rail and weld metal, and the upper and darker portions 6 and 8, respectively, of the photomicrographs representing the rail. In Fig. 5 is indicated in the lower portion 7 a columnar, coarse-grained structure in the weld metal. Above this portion, in the immediately adjacent rail metal is indicated a corresponding junction between rail and weld metal in a weld formed by my process. There will be noted throughout this view, in the upper rail portion 8 and in the lower weld metal portion 9, an extremely fine grain size. The boundary between the rail and weld metal portions has also become much less distinct, thus bringing about a more gradual transition in structure from the original base metal through to the arc fused metal supplied from the welding rod as was hereinabove discussed.

Figs. 7, 8 and 9 illustrate the application of my process to structures other than rails. In Fig. 8 a double-bevel weld between substantially abutting metal portions 12 and 13 is shown. It will be understood that sheet metal might be formed into a tubular or similar shape and edges of the sheet metal welded, in which case 12 and 13 may represent substantially abutting portions of a single portion of metal. Referring to Fig. 8, it will be noted that in certain cases I may desire to remove afterward substantially all the refiner 17, as by a grinding or machining process, whereby I may obtain as a result two metal portions united by a non-porous, fine-grained, stress-relieved seam weld, a result hitherto unobtainable by any electric seam-welding process.

Figs. 7 and 9 show my process as applied to the welding of a T-joint between metal pieces 10 and 11, and 14 and 15, respectively. In Figs. 7 and 8 the metal pieces 10 and 11, and 12 and 13, respectively, are shown as joined by a seam weld 16 upon which is superimposed a refiner 17 of arc melted metal. In the weld illustrated in Fig. 9, I have shown my improved process as carried out by superimposing a refiner 19 of arc melted metal upon a plurality of seam welds 16 and 18. It will be understood that I may prefer also to carry out the process as disclosed herein by superimposing a plurality of refiners of arc melted metal upon the seam weld or welds, grain refinement of the metal of the seam weld or welds and of the adjacent base metal or metals being accomplished by the heat from any or all of the refiners. It will be understood also that my invention contemplates the superimposing of a refiner of one composition of metal upon a seam weld of a different composition. For example, I may desire to superimpose a refiner of high carbon steel upon a seam weld of low carbon steel.

It will be seen that a weld made by my process is greatly superior, mass for mass, to one made similarly, but with merely an ordinary seam weld. It will be obvious, of course, that to form a seam weld and refiner by my process, there may be less metal deposited for the seam weld and for the refiner than if the weld were to be formed entirely with an ordinary seam weld. Hence for the seam weld or for the refiner less time will be required than where a weld is to be made merely by a seam weld. Of course, if it is desired to greatly increase the mass of weld metal, each of the seam weld and refiner shown in Fig. 4 can have a mass of metal substantially as great as that ordinarily used in an ordinary seam weld, with the result that a joint is produced which is many times stronger than if the total amount of seam metal were deposited as an ordinary seam weld.

It will be understood that in electric arc seam welding the heat necessary to grain-refine the seam weld or welds and the adjacent base metal or metals may be obtained by a suitable combination of current and time of welding. To illustrate, if the heat necessary to accomplish the desired improvement in grain structure is being supplied by employing a certain current and time of welding, the same improvement may also be accomplished by using a somewhat lower current and a greater time. Conversely, with a somewhat higher current the welding may be carried out in less time and sufficient heat still be supplied to effect the desired grain-refinement.

It will be seen that advantageous welding conditions obtain by my process. Thus, by welding a joint by one or more seam welds and one or more refiners, each seam weld and refiner may consist of a smaller quantity of weld metal than where all the weld metal is supplied in one operation as in an ordinary seam weld, thus permitting of greater ease of welding and of better positioning of the weld metal with regard to the articles to be welded. Further, where it is desired to produce welds of varying cross-section, such as in the case of tapering seam welds to provide a fillet effect, my process is advantageous in that it is easier to produce such fillet effect where a joint is welded by means of one or more seam welds and one or more refiners. It is moreover easier to obtain a weld consisting of a large quantity of well-positioned weld metal with my process.

It will be understood that I contemplate the use of any suitable source of heat in carrying out my process, such as the carbon arc, the metal arc, or a gas flame, such as the acetylene flame.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

It will be noted that in the above specification I have described my process as being applicable to the welding of articles, fabrications, or portions thereof. I wish it to be understood that the following claims are also to be construed broadly, namely, as applying not merely to the welding of articles, but to the welding of articles, fabrications, or portions thereof.

What I claim is:

1. The process of uniting metal articles by seam welding which comprises producing a seam weld between the articles to be joined and heat-treating the seam weld and the adjacent portions of the articles by superimposing a refiner of melted metal upon said seam weld with sufficient heat to grain-refine the metal of the seam weld and the adjacent portions of the articles.

2. The process of uniting metal articles by seam welding which comprises producing a seam weld between the articles to be joined and heat-treating the seam weld and the adjacent portions of the articles by superimposing a refiner of melted metal upon said seam weld with sufficient heat to grain-refine substantially all the metal of the seam weld.

3. The process of uniting metal articles by seam welding which comprises melting with a portion of the articles adjacent to their junction additional metal to form a seam weld uniting said articles, and superimposing a refiner of melted metal upon said seam weld under such conditions of time and temperature as to grain-refine the seam weld and the adjacent portions of the articles united.

4. The process of uniting metal articles by carbon arc seam welding which comprises forming between the articles a non-porous seam weld by the hand-feed process and superimposing thereon by the hand-feed process a refiner of carbon arc melted metal.

5. The process of uniting ferrous articles by seam welding which comprises melting with a portion of the articles adjacent to their junction additional ferrous metal to form a seam weld uniting said articles, and superimposing a refiner of melted ferrous metal upon said seam weld with sufficient heat to grain-refine substantially all of the seam weld and the adjacent portions of the articles united.

6. The process of uniting ferrous articles by electric arc seam welding which comprises melting additional ferrous metal by means of an electric arc with a portion of the articles adjacent to their junction to form a seam weld uniting said articles, and superimposing a refiner of arc melted ferrous metal upon said seam weld with sufficient heat to grain-refine the seam weld and the adjacent portions of the articles united.

7. The process of uniting ferrous articles by electric arc seam welding which comprises melting additional ferrous metal by means of an electric arc with a portion of the articles adjacent to their junction to form a seam weld uniting said articles, and superimposing a refiner of arc melted ferrous metal upon said seam weld with sufficient heat to grain-refine substantially all the seam weld.

8. The process of uniting ferrous articles by carbon arc seam welding which comprises melting additional ferrous metal by means of a carbon arc with a portion of the articles adjacent to their junction to form a seam weld uniting said articles, and superimposing a refiner of arc melted ferrous metal upon said seam weld with sufficient heat to grain-refine substantially all of the seam weld and the adjacent portions of the articles united.

9. The process of uniting ferrous articles by seam welding which comprises melting with a portion of the articles adjacent to their junction additional ferrous metal to form a seam weld uniting said articles, laying refiners of melted ferrous metal adjacent to the junction of the articles to be united with sufficient heat so that the seam weld metal and a portion of the metal of the articles underlying said refiners are heat-treated and grain-refined.

10. The process of uniting ferrous articles by electric arc seam welding which comprises melting additional ferrous metal by means of the electric arc with a portion of the articles adjacent to their junction to form a seam weld uniting said articles, laying refiners of arc melted ferrous metal adjacent to the junction of the articles to be united with sufficient heat so that the seam weld metal and a portion of the metal of the articles underlying said refiners are heat-treated and grain-refined.

11. A weld between two metal articles composed of a seam weld upon which is superimposed a refiner of metal, the metal of the seam weld and adjacent portions of the articles united being grain-refined.

12. The process of uniting metal articles by seam welding which comprises melting with a portion of the articles adjacent to their junction additional metal to form a plurality of seam welds uniting said articles, superimposing a refiner of melted metal upon said seam welds with sufficient heat to grain-refine substantially all of the metal thereof and the adjacent portions of the articles united.

13. The process of forming a weld between a fish plate and a rail which comprises melting with a portion of the rail and fish plate metal adjacent to their junction additional welding material to form a seam weld uniting said rail and fish plate metal, and superimposing a refiner of melted metal upon said seam weld with sufficient heat to grain-refine substantially all of the metal of the seam weld.

14. The process of forming a weld between a fish plate and a rail which comprises preheating portions of the fish plate and rail, melting with a portion of the rail and fish plate metal adjacent to their junction additional welding material to form a seam weld uniting said rail and fish plate metal, and superimposing a refiner of melted metal upon said seam weld with sufficient heat to grain-refine substantially all of the metal of the seam weld.

15. The process of forming a weld between a fish plate and a rail which comprises melting with a portion of the rail and fish plate metal adjacent to their junction additional welding material to form a seam weld uniting said rail and fish plate metal, and superimposing a refiner of melted metal upon said seam weld with sufficient heat to grain-refine substantially all of the metal of the seam weld, and postheating said weld.

16. The process of forming a weld between a fish plate and a rail which comprises melting with a portion of the rail and fish plate metal adjacent to their junction additional welding material to form a seam weld uniting said rail and fish plate metal, and superimposing a refiner of melted metal upon said seam weld with sufficient heat to grain-refine the metal of the seam weld and the adjacent portions of the rail and fish plate metal.

17. The process of forming a weld between a fish plate and a rail which comprises melting with a portion of the rail and fish plate metal adjacent to their junction additional welding material to form a seam weld uniting said rail and fish plate metal and superimposing upon portions of said seam weld a refiner of melted metal with sufficient heat to grain-refine the metal of the seam weld and the adjacent portions of the rail and fish plate metal.

18. The process of uniting a fish plate to a rail by seam welding which comprises melting with a portion of the fish plate and rail adjacent to their junction additional ferrous metal to form a seam weld uniting said fish plate and rail, superimposing refiners of melted metal upon said seam weld with sufficient heat so that substantially all the resultant weld will be heat-treated and grain-refined.

19. The process of uniting a fish plate to a rail by carbon arc seam welding which comprises melting with a portion of the fish plate and rail adjacent to their junction additional ferrous metal by the hand-feed process to form a seam weld, uniting said fish plate and rail in such manner that approximately equal amounts of fish plate and rail metal are melted, superimposing upon said seam weld by the hand-feed process refiner metal equivalent in mass to from 25% to 400% of the mass of the seam weld under such conditions of time and temperature as to grain-refine substantially all the seam weld and also portions of the plate and rail adjacent thereto.

20. The process of uniting a fish plate to a rail by carbon arc seam welding which comprises melting with a fish plate and rail adjacent to their junction additional ferrous metal at a rate of from 1 to 8 inches of $\tfrac{9}{32}$ inch diameter rod per minute to form a seam weld at a rate of from about 1" to about 4" per minute uniting said fish plate and rail, applying on said seam weld a refiner formed at a rate of from about 1" to about 4" per minute of metal melted at a rate equivalent to the melting and depositing of 1 to 8 inches of $\tfrac{9}{32}$ inch diameter rod per minute.

21. The process of uniting a fish plate to a rail by carbon arc seam welding which comprises forming between said fish plate and rail a non-porous seam weld by the hand-feed process and superimposing upon all or portions of said seam weld by the hand-feed process a refiner of carbon arc melted metal.

22. The process of uniting a fish plate to a rail by carbon arc seam welding which comprises forming between said fish plate and rail a non-porous seam weld by the hand-feed process at a rate of three inches per minute, employing therefor about 200 amperes and melting the equivalent of about 4 inches of $\tfrac{9}{32}$ inch diameter rod per minute in forming said seam weld, superimposing upon portions of said seam weld by the hand-feed process a refiner of carbon arc melted metal formed at about the same linear rate and with about the same current and the same rate of melting metal as employed in forming the seam weld.

23. A rail joint comprising aligned rails, fish plates fitting between the fishing surfaces of the adjacent ends of the rails, seam welds joining the said fish plates to the head and base of the rails, and refiners of metal superimposed upon portions of the seam welds.

24. A rail joint comprising aligned rails, fish plates fitting between the fishing surfaces of the adjacent ends of the rails, and a plurality of seam welds and superimposed refiners joining the said fish plates to the head and base of the rails.

25. A rail joint comprising aligned rails, fish plates fitting between the fishing surfaces of the adjacent ends of the respective rails, and a plurality of seam welds and superimposed refiners joining the said fish plates to the rails.

26. A rail joint comprising aligned rails, fish plates fitting between the fishing surfaces of the adjacent ends of the respective rails, and a plurality of seam welds joining the said fish plates to the rails, substantially all the seam weld metal being heat-treated and grain-refined by the welding process.

27. The process of heat treating a seam weld and the adjacent portions of the base metal attached thereto which comprises superimposing molten metal on the seam weld under such conditions of time and temperature as to cause grain-refinement in the seam weld and adjacent portions of the base metal attached thereto.

28. A rail joint comprising aligned rails, fish plates fitting between the fishing surfaces of the adjacent ends of the respective rails, said fish plates being joined to the rails by a plurality of seam welds and refiners of metal superimposed thereon, said refiners being laid on with sufficient heat to heat-treat portions of the weld metal and the adjacent portions of the rail so that internal stresses are substantially relieved.

29. A weld between two metal articles composed of a seam weld upon which is superimposed a refiner of metal, the first seam weld and the adjacent portions of the articles united having been sufficiently heated by said refiner so that internal stresses are substantially relieved.

30. An article of manufacture comprising base metal and weld metal integrally united to each other, the adjacent portions of the weld metal and base metal being relatively fine-grained as compared with the remaining portions of the base metal.

31. An article comprising integrally united base metal and weld metal, the adjacent portions of the weld metal and base metal being relatively fine-grained as compared with the remaining portions of the base metal and characterized by having been refined by a welding operation subsequent to the uniting of the weld and base metals to each other.

32. An article comprising a base metal and electrically deposited weld metal integrally united thereto, the adjacent portions of the weld metal and base metal being relatively fine-grained as compared with the remaining portions of the base metal and being characterized as having been refined by an electric welding operation subsequent to the uniting of the weld and base metals to each other.

In testimony whereof I hereunto affix my signature this 27th day of March, 1925.

JOHN B. AUSTIN.